March 26, 1940.  J. W. HATCH ET AL  2,194,853
BRAKING MECHANISM
Filed March 28, 1938
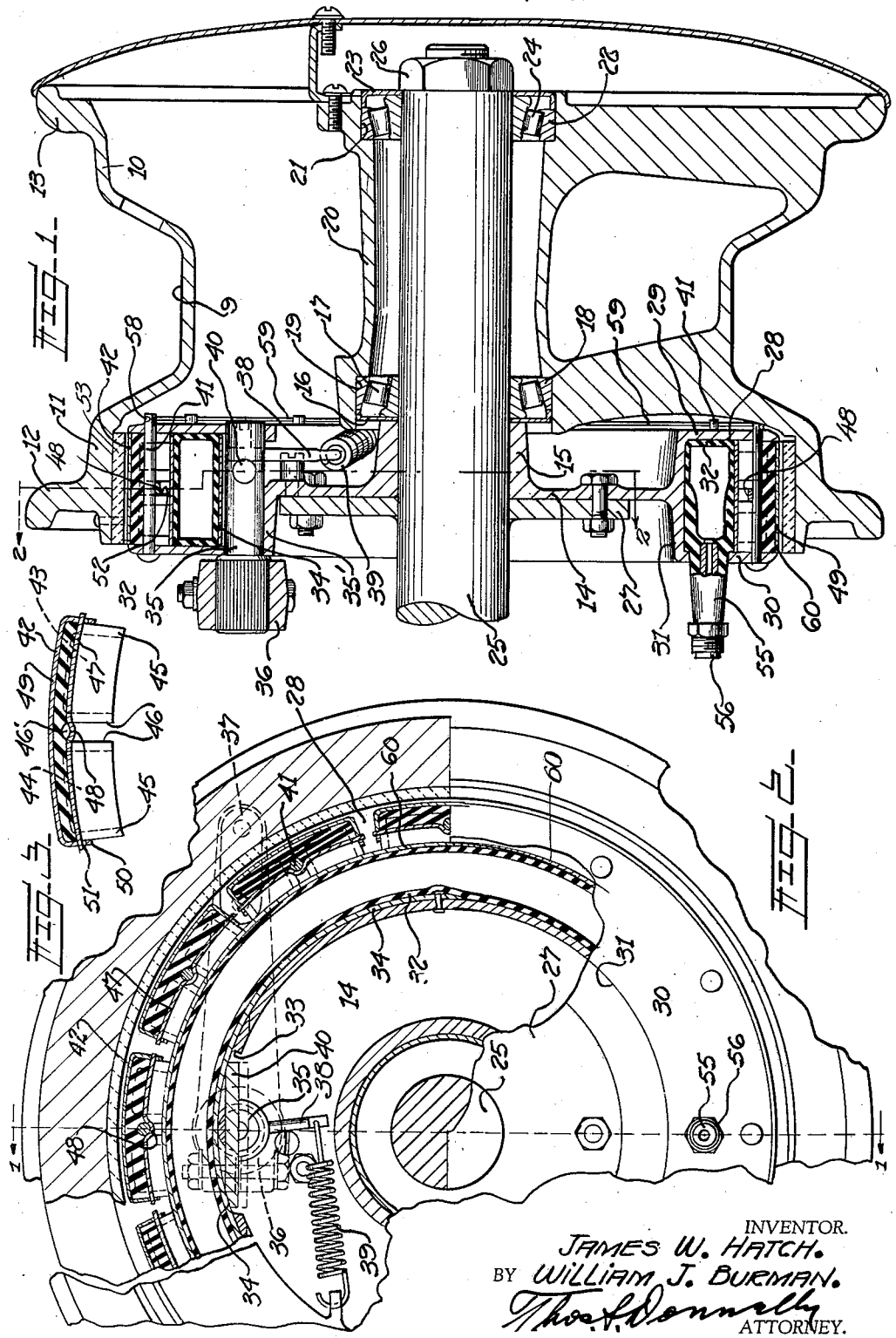
INVENTOR.
JAMES W. HATCH.
BY WILLIAM J. BURMAN.
Thos. F. Donnelly
ATTORNEY.

Patented Mar. 26, 1940

2,194,853

UNITED STATES PATENT OFFICE 2,194,853

BRAKING MECHANISM

James W. Hatch and William J. Burman, Detroit, Mich., assignors, by direct and mesne assignments, to The Firestone Tire & Rubber Company, Akron, Ohio, a corporation of Ohio Application March 28, 1938, Serial No. 198,356

4 Claims. (Cl. 188—152)

Our invention relates to a new and useful improvement in a braking mechanism adapted for use on rotating bodies of various types and particularly adapted for use on vehicle wheels and especially wheels used on airplanes.

It is an object of the present invention to provide a braking mechanism whereby the friction members will be pressed outwardly, individually, by an expansive member such as a tube or the like and a locking of the braking shoes or presser members avoided.

It is another object of the present invention to provide a brake of this class which will be highly efficient in use, easily and quickly operated, economically manufactured, durable, compact, and easily and quickly assembled.

Another object of the invention is the provision of a brake mechanism which may be operated by the expansion of an expandable tube and also by a mechanical operation.

Another object of the invention is the provision of a braking mechanism having a peripheral row of shoes provided with mechanism for applying pressure equally to all of said shoes simultaneously.

Another object of the invention is the provision of a braking mechanism whereby there will be uniform wear on the brake lining.

Another object of the invention is the provision of a braking mechanism extremely smooth and positive in action and capable of use on a rotating body which may be rotated in either direction.

Another object of the invention is the provision of a braking mechanism having a plurality of brake shoes of minimum weight.

Another object of the invention is the provision of a braking mechanism having a plurality of brake shoes so arranged, constructed and mounted that positive and instant release of the shoes from braking position to non-braking position is effected immediately upon the release of the braking pressure.

Other objects will appear hereinafter.

Fig. 1 is a central, vertical, sectional view of a wheel showing the invention applied and taken on line 1—1 of Fig. 2.

Fig. 2 is a fragmentary, sectional view taken on line 2—2 of Fig. 1 with parts shown in side elevation and parts shown in section.

Fig. 3 is a longitudinal, central, sectional view through one of the braking shoes.

It will appear obvious from the description given that this braking mechanism may be used on any type of rotating body to which it is adapted but in the drawing we have illustrated the invention used with a wheel of a construction especially used on airplanes. This wheel embodies on its periphery the central groove or cavity 9 in which the pneumatic tube would engage. The inner edges of the tire casing beads would engage on the flanges 10 and 11 and the side flanges 12 and 13 would serve as locks therefor. The braking mechanism comprises a drum embodying the disk 14 having the central hub 15, the inner end of which engages a ring 16 which cooperates with the ring 18 to retain the roller bearings 17 in position and form a roller bearing. The ring 18 fits in the cut-away portion 19 of the wheel hub 20. The inner face of this wheel hub 20, at its outer end, is also recessed as at 21 to accommodate the bearing ring 22 cooperating with the ring 23 to retain the rollers 24 in position. The shaft is journalled in these bearings, the ring 23 being stationary relatively to the shaft 25 and the wheel hub 20 rotating about the roller bearings 17 and 24 and carrying with it the rings 18 and 22. A nut 26 is threaded upon the shaft 25 and serves to engage the outer face of the ring 23 to retain the same in position.

Bolted or otherwise suitably secured concentrically to the disk 14 at the center thereof is the plate 27 which is welded or otherwise secured in fixed relation to the shaft 25, this shaft remaining stationary. The brake drum is provided with the trough 28 formed on the disk 14 and having the side walls 29 and 30 and the base 31. Positioned in this trough is an annular rubber tube 32 having a stem 55 with suitable valve mechanism so that the tube may be inflated either with air or with liquid. A fitting 56 is mounted on the stem 55 so that connections to a source of fluid supply under pressure may be made. The base 31 of the trough carried by the disk 14 is cut-away as at 33 and overlying this cut-away portion is an arcuate spring plate 34. A rocker shaft 35 is journalled in the bearing 35', carried by the disk 14. Fixedly mounted on this rocker shaft is a hub 36 carried by the rocker arm 37. Secured fixedly to the shaft 35 and extending therefrom is an arm 38, one end of which is connected to one end of the spring 39 the other end of said spring being connected to the disk 14 so that the spring 39 serves to resist rocking of the shaft 35 in one direction and tends to retain it in its normal position. Projected diametrically through the shaft 35 in registration with the slot 33 and projecting outwardly from opposite sides of the shaft 35 is the pin 40. The arrangement is such that upon a rocking of the shaft 35 in either direction, the pin 40, at one or the other of its ends, will engage and serve to press the resilient spring plate 34 outwardly so as to flatten the tube 32 locally and force the fluid therein into the other part of the tube to increase the pressure therein and force the brake shoes 42 outwardly. Projecting through the side walls 29 and 30 of this trough-shaped structure at spaced intervals are pins 41. The brake shoes illustrated in Fig. 3 may be formed from any desirable material and are preferably provided on their inner faces with the pockets 43 and 44 so as to provide the end walls 45 and the central partitions or end walls 46 leaving the space 46' through which the pins 41 are projected. There is a shoe for each of the pins 41 and each shoe is held in position by a resilient metal leaf spring 47 which is projected through the end walls and partition walls and provided at its center with the arcuate portion 48. A cover 42 may be used, if desired, and pressed over the shoe, the end flanges having openings 51 formed therein registering with the openings 52 formed in the end walls 45 so that the spring 47 projects through the end walls 50 of the cover and serves to retain the same in position. These shoes are rockable on their pivot pins 41 so that they will equalize themselves about this pin and adjust to the contour of the frictional surface with which contacting. The arcuate portion 48, of course, prevents longitudinal movement of the spring 47. It is believed obvious that the annular portion 11 has an annular unobstructed inner surface on which the brake lining 53 is attached. It is believed obvious that the cover 42 may be eliminated when desired and that, if desired, the brake lining 53 may also be dispensed with, the rockably mounted shoes being formed from suitable gripping material.

The pins 41 are provided on their inner ends which project beyond the side wall 29 with a groove 58 in which is engaged a wire 59 to retain the pins in position. It is obvious that the groove 58 may be replaced with a hole formed in the ends of the pins 41 and the wire 59 threaded therethrough if desired.

In operation when the device is to be used by means of a fluid in the tube 32, the fluid pressure would be built up through the stem 55 in any desirable manner and the tube 32 would be expanded against the resilient band 60 which is annular and the ends of which overlap and are free. This band would be forced outwardly to press the shoes 42 outwardly into engagement with the brake lining 53 mounted on the face 54 of the wheel or rotating part. Each of the shoes would, of course, be subjected to the same pressure due to the method of transmitting pressure to these shoes. The outward movement of the shoes would be against the resiliency of the spring 47 so that when the outward pressure exerted by the expanded tube 32 is released, the spring 47 would move the shoes inwardly and return them to non-engaging or inoperative position.

It is believed obvious that an easy, smooth operation will be effected by a braking mechanism of this type and that the device is operative regardless of direction of rotation of the wheel.

When it is desired to operate the device mechanically, the shaft 35 would be rocked effecting a compression of the tube 32 as previously described. It is believed obvious that the arm 37 may be projected from the shaft 35 in any desired direction.

While we have illustrated and described the preferred form of construction, we do not wish to limit ourselves to the precise details of structure shown, but desire to avail ourselves of such variations and modifications as may come within the scope of the appended claims.

What we claim as new is:

1. A braking mechanism of the class described, adapted for use with a rotatable member having an annular portion provided with an annular inner surface free from projections, comprising: a brake lining mounted on said annular surface; a circular supporting member; means for mounting said supporting member stationary, an expansible annular tube mounted on said supporting member in embracing relation; an expansible covering overlying the peripheral surface of said tube; a plurality of individual brake shoes arranged about said covering circumferentially and in spaced relation to each other; means for mounting each of said shoes on said supporting member, each of said shoes being movable inwardly and outwardly of said supporting member, the expansion of said tube forcing said covering into engagement with said shoes for forcing the same outwardly into engaging relation with said brake lining; resilient means associated with each of said shoes for resisting outward movement thereof and moving the same inwardly, upon release of outward pressure on said shoes; a resilient arcuate member lying between said tube and said supporting member at one part thereof; and means engageable with said arcuate resilient member for compressing a portion of said tube for expanding the remainder thereof.

2. A braking mechanism of the class described, adapted for use with a rotatable member having an annular portion provided with an annular unobstructed inner surface, comprising: a circular supporting member; means for mounting said supporting member stationary; a tubular annular expansible member carried by said supporting member in embracing relation and adapted, upon expansion, for exerting radial outward pressure; a plurality of circumferentially arranged spaced shoes having an arcuate outer face; an axially directed pin on said supporting member, outwardly of said tubular member, at each of said shoes, each of said shoes being adapted to straddle the pin at substantially the transverse medial line of the shoe; a metallic U-shaped covering for each of said shoes, the legs of said covering embracing opposite ends of the shoe and provide with slots; and a spring member projected through each of said slots and overlying the pin and engaging the same for cooperating therewith and for mounting said shoe tiltable and movable radially inwardly and outwardly, the outward movement being against the tension of said spring, the outer surface of said covering engaging in frictional contact with the said inner surface of said rotatable member upon radial outward movement of said shoe; and means for expanding said tubular member for forcing said shoe radially outwardly.

3. A braking mechanism of the class described, adapted for use with a rotatable member having an annular portion provided with an annular unobstructed inner surface, comprising: a circular supporting member; means for mounting said supporting member stationary; a tubular annular expansible member carried by said supporting member in embracing relation and adapted, upon expansion, for exerting radial outward pressure; a plurality of circumferentially arranged spaced shoes having an arcuate outer face; an axially directed pin on said supporting member, outwardly of said tubular member, at each of said shoes, each of said shoes being adapted to straddle the pin at substantially the transverse medial line of the shoe; a metallic U-shaped covering for each of said shoes, the legs of said covering embracing opposite ends of the shoe and provided with slots; and a spring member projected through each of said slots and overlying the pin and engaging the same for cooperating therewith and for mounting said shoe tiltable and movable radially inwardly and outwardly, the outward movement being against the tension of said spring, the outer surface of said covering engaging in frictional contact with the inner surface of said rotatable member upon radial outward movement of said shoe; means for expanding said tubular member for forcing said shoe radially outwardly; and a split annular member embracing said tubular member and lying between the pin and said shoe, and engageable with said shoe for forcing the same outwardly upon the expansion of said tubular member.

4. Braking mechanism of the class described, adapted for use with a rotatable member, having an annular portion provided with an annular inner surface comprising a supporting member, means for mounting said supporting member stationarily, an expansible annular tube adapted to contain a non-compressible force transmitting medium and mounted on said supporting member in embracing relation therewith, a plurality of individual brake shoes arranged about said tube, means for associating said brake shoes with said supporting member to permit radial displacement of said shoes while preventing relative circumferential movement, resilient means associated with each of said shoes for resisting outward movement thereof and for moving the same inwardly upon release of outward pressure upon said shoes, a resilient arcuate member engaging the inner circumference of said tube at one part thereof and means engageable with said arcuate resilient member for compressing the portion of said tube whereby the outer circumference of said tube will be expanded through the medium of said fluid to actuate said brake shoes.

JAMES W. HATCH.
WILLIAM J. BURMAN.